United States Patent [19]

Sciard

[11] 4,196,788

[45] Apr. 8, 1980

[54] DEVICE FOR PROPELLING A LIQUID PROJECTILE IN A LIQUID MEDIUM WITH A VIEW TO CREATING A SHOCK WAVE

[75] Inventor: Alain Sciard, Paris, France

[73] Assignee: Centre National pour l'Exploitation des Oceans, Paris, France

[21] Appl. No.: 897,144

[22] Filed: Apr. 17, 1978

[30] Foreign Application Priority Data

Apr. 22, 1977 [FR] France ............................. 77 12287

[51] Int. Cl.$^2$ ........................... G01V 1/04; G01V 1/38
[52] U.S. Cl. .................................. 181/120; 181/118; 181/119
[58] Field of Search ........................ 181/119, 120, 118

[56] References Cited

U.S. PATENT DOCUMENTS

| | | | |
|---|---|---|---|
| 3,369,627 | 2/1968 | Schempf | 181/120 |
| 3,949,831 | 4/1976 | Cassand et al. | 181/120 |
| 3,997,022 | 12/1976 | Cholet | 181/119 |

FOREIGN PATENT DOCUMENTS

2307999  12/1976  France ..................................... 181/120

OTHER PUBLICATIONS

V. Renard et al., Sixth Annual Offshore Technology conference, Paper #OTC 2017, May 6, 1974, 181-120.

*Primary Examiner*—S. C. Buczinski
*Attorney, Agent, or Firm*—Lewis H. Eslinger

[57] ABSTRACT

The invention relates to a device for propelling a liquid projectile to create a shock wave by implosion, said device comprising a cylinder containing two pistons, a reservoir of pressurized fluid acting on the pistons, a stop for stopping the piston, a perforated connecting piece to permit the escape of the propelled liquid and for connecting the cylinder with a return mechanism. The invention is applied to underwater oil prospecting.

7 Claims, 3 Drawing Figures

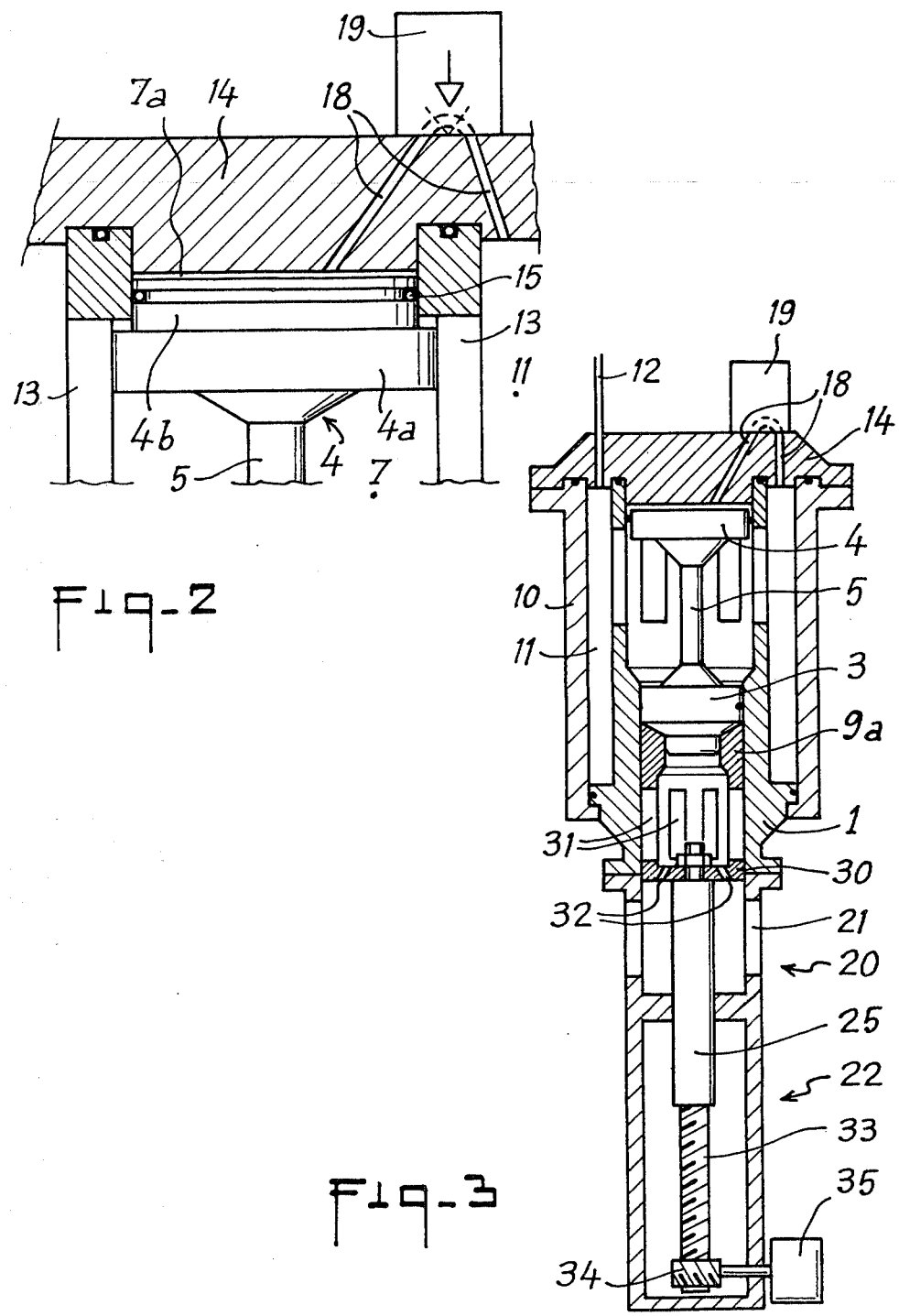

DEVICE FOR PROPELLING A LIQUID PROJECTILE IN A LIQUID MEDIUM WITH A VIEW TO CREATING A SHOCK WAVE

The present invention relates to a device for repetitively propelling a liquid projectile in such kinematic conditions that, on leaving the device, the projectile creates a cavitation in its wake which, on imploding, produces a shock wave. A study of the propagation of this shock wave in the solid media located beneath the liquid medium is useful, particularly in the domain of oil prospecting.

Various devices are known for producing a shock wave in an underwater medium. Certain of these employ the effect of explosion provoked by the sharp release of pressurised air or gas in the liquid, others consist either in the creation of a vapour bubble condensing brusquely, or in the creation of a synthesized eudiometric mixture of oxygen and hydrogen, or finally in the creation of a cavitation behind a liquid or solid body moving in the water, so as to create a "vacuum" in which the ambient medium implodes.

The main drawbacks of these known devices reside in the fact that they necessitate powerful means for using them, taking into account their very low yield and the considerable consumption of pressurised gas inherent in their designs.

To obviate these drawbacks, the invention proposed a device for creating a shock wave by implosion behind a liquid projectile propelled by this device in adequate dynamic conditions. The main advantage of this device is to allow a saving in the consumption of pressurised gas, the energy necessary for its functioning being supplied in a form which is much easier to handle.

To this end, the invention relates to a device for propelling a liquid projectile in a liquid medium so that, on leaving the device, said projectile creates in the liquid medium a cavitation capable of imploding. The device includes at least one cylinder and a piston dividing the cylinder into two separate chambers, sealed from each other, the first of the chambers being in communication with a source of pressurised gas, the second chamber being in communication with said medium. One end of the cylinder is provided with means for stopping the displacement of the piston.

According to the invention, a mobile element is located in said first chamber and comprises the propelling piston, a guide and retaining piston coupled remotely to the propelling piston. A source of pressurised gas is in communication with the first chamber via an annular chamber arranged around the cylinder and through radial openings made between the first chamber and the annular chamber in the wall of said cylinder. The end of the first chamber is adapted to be insulated from the source of pressurised gas by the guide and retaining piston so as to constitute a sub-chamber comprising a bleed conduit equipped with a member for its controlled obturation and a conduit for communication with said source and equipped with a controlled obturator. Finally, the open end of the second chamber is extended by a radially perforated piece connecting said cylinder with a mechanism for returning the mobile equipment located in line therewith comprising a rod and means for controlling its displacement along the axis of said mobile equipment.

In a variant embodiment of the invention, the stop means are fixed to the rod of the mechanism returning the mobile equipment by means of a perforated cylinder, mounted to slide in the connecting piece and in the cylinder. The openings of the perforated cylinder are provided to be in register with the openings of said connecting piece when the return mechanism is in its retracted position.

The invention will be more readily understood on reading the following description with reference to the accompanying drawings, in which:

FIG. 2 illustrates, in a partial cross-sectional view, a variant and a detail of the embodiment according to FIG. 1;

FIG. 3 is an illustration of a second embodiment of the device according to the invention.

Figure 1:
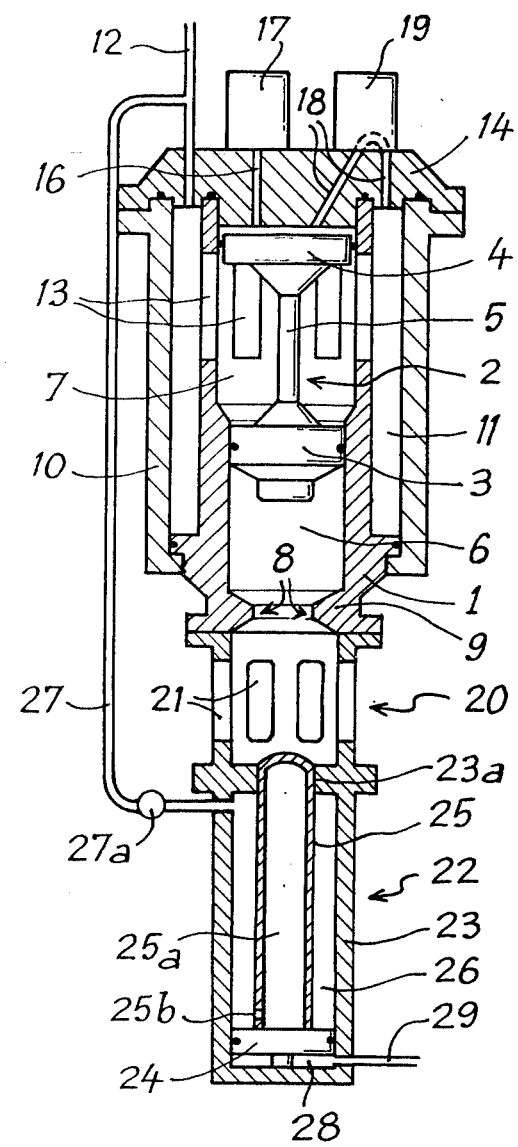
FIG. 1 is a schematic cross-sectional illustration of a first embodiment of the device according to the invention.

Referring now to the drawings, FIG. 1 shows a first cylinder 1 in the form of a tubular sleeve in which is slidably mounted a mobile element 2 comprising a propelling piston 3, a guide and retaining piston 4 whose diameter is at least equal to that of the piston 3 and a connecting rod 5 connecting the two pistons. The piston 3 divides the internal volume of the cylinder 1 into two chambers 6 and 7 which are sealed with respect to each other. The chamber 6 is open at 8 at the end of the cylinder to the outside medium; and chamber 7, which contains the piston 4 and the rod 5, is in communication with a source of pressurised air or gas, in the manner described hereinafter. The cylinder 1 is provided at the opening 8 with means 9 for stopping the piston 3.

The cylinder 1 is surrounded by an outer cylinder 10 defining with said cylinder 1 an annular chamber 11 connected by a conduit 12 to the source of pressurised gas (not shown). Said annular chamber 11 communicates with chamber 7 by means of radial openings 13 made in the wall of upper ends of cylinders 1. The cylinder 1 and 10 are closed by a common cover 14.

It will be noted, particularly with reference to FIG. 2, that the upper part 7a of chamber 7 may be insulated from the source of pressurised gas by the piston 4. FIG. 2 shows a piston 4 comprising two cylindrical bearing surfaces 4a and 4b, one, 4a, being a bearing surface for guiding the mobile element on the inner face of the cylinder 1, the other, 4b, being a bearing surface for the tight slide of the piston 4 on the part of the inner face loacted above the windows 13. The diameter of the bearing surface 4b is in this case smaller than that of the bearing surface 4a to avoid premature wear of the seal 15 which, consequently, functions only upon a very slight displacement of piston 4.

This part or sub-chamber 7a communicates by a bleed conduit 16 (FIG. 1) with the outside medium. This conduit may be obturated by controlling an electrovalve 17. A conduit 18 connects the sub-chamber 7a to the annular chamber 11 when the electrovalve 19, which may interrupt this communication, is open.

It will be noted, in FIG. 2, that the sub-chamber 7a possesses only one communication, via 18 and 19, with the annular chamber 11.

The open end at 8 of the cylinder 1 bears, by means of a hollow connecting piece 20 having radial windows 21 formed therein, a mechanism 22 for returning the piston 3, and thus the mobile element, into a position "ready for firing " or "cocked". This mechanism includes a double acting jack whose cylinder 23 is fast with the piece 20, or even integral therewith, and whose piston 24 possesses a rod 25 which is sufficiently long so that, at the end of extension, it has placed the mobile equipment in its "cocked" position, i.e. the piston 4 is at the nearest possible position to the cover 14. The rod 25 will advantageously be hollow and its inner recess 25a communicates with the chamber 26 of the jack by means of an opening 25b. Thus, the recess 25a constitutes a place for the pressureised gas in the chamber 26 to enter when the piston 24 rises, thereby notably limiting the compression of the gas when the piston rises.

It should also be noted that the orifice 25b is, at the end of its stroke, obturated by the slide bearing surface 23a of the rod 25 in the cylinder 23. A cushion of gas is thus formed between the piston and the adjacent end of the the cylinder which constitutes an end of stroke damper for the piston.

The chamber 26 of said jack is filled with a pressurised gas, issuing from said source through a conduit 27. A pressure reducer 27a provided with a non-return valve integrated or not with the pressure regulator and not shown, is preferably placed in this conduit, preventing the return of the gas from chamber 26 in the conduit 27. The chamber 28 may be connected by a conduit 29 to another source of pressurised fluid which may be an oil pump.

The device operates in the following manner.

It will first be assumed that the piston 3 is in abutment on the stops 9. This position is the "uncocked" position of the device. A pressurised gas is admitted through conduit 12 into the annular chamber 11 and through openings 13 into the chamber 7. This pressurised gas also supplies, through conduit 27, the chamber 26 of the jack 22. It will be assumed that the electrovalves 17 and 19 are in their position obturating the conduits 16 and 18.

Furthermore, the chamber 28 of the jack 24 is supplied with oil through 29 under such a pressure that the rod 25 is raised and pushes piston 3. If the supply of gas through conduit 12 is closed, the pressure inside the chambers 7, 11 and 26 increases and a powerful oil supply must be provided, taking into account the increase in the effort to be overcome. If, on the other hand, the conduit 12 is open, whatever the variation in volume of the chamber 7, there will be no variation of pressure therein. The rise of the mobile element 2 away from stop 9 opens the chamber 6 to the outside medium so that the chamber fills with the ambient liquid passing between the rod 25 and the inner edges of the opening 8. When the mobile element 2 arrives near the cover 14, and in particular when the seal 15 (FIG. 2) becomes effective, the valve 17 is opened, to bleed the sub-chamber 7a. By then closing the valve 17, a pressure condition is creatd in subchamber 7a which makes it possible to retain the mobile equipment in its high or cocked position due to the predominance of the effect of the pressure beneath the piston 4, of larger diameter than that of piston 3, to which must be added the effect of the hydrostatic pressure applied beneath the piston 3. The return of the rod 25 into the jack 22 may then be allowed by placing the chamber 28 in communication with an oil tank, delivery being effected by the pneumatic pressure prevailing in the chamber 25.

In the variant embodiment shown in FIG. 2, the electrovalve 19 is open until the end of the rise of the mobile element 2. By closing this electrovalve 19, the sub-chamber 7a is isolated. During the return of the rod 25 of the return mechanism, the mobile equipment 2 accompanies this descending movement slightly and is immobilised as this descent produces a drop in pressure in the sub-chamber 7a which retains the mobile element.

The initiation of the firing is effected by opening the valve 19. The pressurised gas is then admitted behind the piston 4 and propels the mobile element towards the stop means 9. This propulsion is especially violent when the piston 4 uncovers openings 13. The liquid contained in the chamber 6 is then propelled by piston 3 into the piece 20 then to the outside through the windows 21. The piston 3 is then brusquely braked by lamination of fluid between it and the stop means 9. By inertia, the liquid "becomes detached" from the piston and a cavity is formed in its wake, which cavity thereafter implodes. It then suffices to begin again the cycle of cocking as described hereinabove.

In FIG. 3, certain of the elements described with regard to the preceding Figures are to be found, with the same references. The Figure shows that the stop means, here referenced 9a, are fast with a tubular piece 30 provided with radial openings 31 and with openings at the bottom 32. This tubular piece 30 is coupled to the end of the rod 25 of the return mechanism 22 and slides in the inner bore of the cylinder 1 and in the connecting piece 20. The location and dimensions of the openings 31 are such that, in the retracted position of the return mechanism, the windows 31 are exactly in register with the openings 21 of the piece 20. It will be noted that the return mechanism is here constituted by a screw-nut system, the nut (rod 25) being immobilised in rotation in known manner (not shown), the screw being shown at 33 and rotated by the driven shaft 34 of an electric or like motor 35.

When the mobile equipment is cocked, the tubular piece 30 slides from piece 20 in the bore of the cylinder 1. When the rod 25 retracts, the admission of water replacing the volume of the tubular piece which withdraws in the chamber 6 of the cylinder 1 is ensured, as long as the windows 31 are not uncovered, through the orifices 32. These latter are obturated by the top of the mechanism 22 when the tubular piece is in low position.

The advantages of the invention reside in the very low volumetric consumption of pressurised gas. In fact, the bleeding of the sub-chamber 7a (FIG. 1) is the only consumption of gas. It should further be noted that in the embodiment illustrated in FIG. 2, this consumption is zero. In addition, the firing energy may be brought by a fluid (oil. . .) which is much more workable at high pressures than a gas and does not require expensive and voluminous installations. This arrangement enables the invention to be adapted to all types of ships or boats without requiring very large power equipment.

Finally, particularly concerning the variant of FIG. 3, a defective or false manoeuvre triggering off firing too early whilst the return mechanism is not completely retracted does not cause considerable damage to said latter. In fact, the fluid propelled too early by the piston 3 will always be braked by the lamination of the fluid made between it and the stops 9a before coming into contact with these stops, this enabling a violent shock of the piston 3 with the return mechanism to be avoided.

The invention finds interesting application in the domain of underwater oil prospecting.

What is claimed is:

1. In a device for propelling a liquid projectile in a liquid medium to create in the said medium a cavitation capable of imploding, said device comprising at least one cylinder having a first closed end and a second opposite opened end and a first piston dividing the cylinder into first and second separate chambers sealed from each other by said first piston, said first chamber being in communication with a source of pressurized gas, and said second chamber being in communication with said medium through said opened end of the cylinder; said cylinder including means for stopping displacement of said first piston, a mobile element extending in said first chamber and including said first piston, a guide and retaining piston and means for connecting said guide and retaining piston remotely to said first piston; said first piston comprising a propelling piston for propelling a liquid projectile; means for defining an air chamber surrounding said first chamber, said cylinder having openings therein providing communication between said first chamber and said annular chamber; and said source of pressurized gas being in communication with said first chamber via said annular chamber through said openings between the first chamber and the annular chamber in the wall of said cylinder; the first end of said first chamber having a predetermined configuration selected to cooperate with the guide and retaining piston to define a sub-chamber; and a conduit connecting said sub-chamber with said source of pressurized gas and including means for controlling its obturation; the open end of the second chamber including an extended radially perforated piece; and means connected to said perforated piece for returning the mobile element located in line therewith, said returing means comprising a rod and means for controlling displacement of said rod along the axis of said mobile element.

2. The device of claim 1, including a bleed conduit connecting said sub-chamber with the ambient medium and including means for controlling its obturation.

3. The device of claim 1, wherein said conduit connects the sub-chamber to the source of pressurized gas connecting the sub-chamber to the annular chamber.

4. The device of claim 1, includ- a perforated cylinder securing said stop means to the rod of said returning means for movement therewith, said perforated cylinder being mounted to slide in said radially perforated piece and in said second chamber of the cylinder, said perforated cylinder having openings formed therein in register with the openings of said radially perforated piece when the returning means is in its retracting position.

5. The device of claim 4, wherein the perforated cylinder has conduits formed therein communicating with the ambient medium.

6. The device of claim 1, wherein said returning means includes a second cylinder having a piston therein connected to said rod and separating said second chamber into a hydraulic chamber on the side of the piston opposite the rod and a pneumatic chamber on the side of the rod and means for hydraulically moving said piston and rod toward said mobile element by applying hydraulic pressure to the last mentioned piston in said hydraulic chamber; said rod being hollow and having an opening formed therein providing communication between the interior of the rod and said pneumatic chamber; said rod being returned pneumatically upon release of hydraulic pressure by the cushion of gas inside the rod formed therein during application of hydraulic pressure to said second cylinder.

7. The device of claim 1, wherein said means for controlling displacement comprises a screw jack and a control motor.

* * * * *